United States Patent
Blanding

(10) Patent No.: US 8,312,460 B1
(45) Date of Patent: Nov. 13, 2012

(54) ALLOCATING COMPUTER RESOURCES TO WORKLOADS USING UTILIZATION BASED PROBABILITY DISTRIBUTIONS

(75) Inventor: William H. Blanding, Bow, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1575 days.

(21) Appl. No.: 11/752,231

(22) Filed: May 22, 2007

(51) Int. Cl.
 *G06F 9/46* (2006.01)
(52) U.S. Cl. ........................................ 718/104
(58) Field of Classification Search .................. 718/104
 See application file for complete search history.

(56) References Cited

U.S. PATENT DOCUMENTS

| | | | |
|---|---|---|---|
| 2003/0220984 A1* | 11/2003 | Jones et al. | 709/219 |
| 2005/0240668 A1* | 10/2005 | Rolia et al. | 709/223 |
| 2006/0047813 A1* | 3/2006 | Aggarwal et al. | 709/226 |

OTHER PUBLICATIONS

Hewlett-Packard Company, "HP-UX Workload Manager overview", 2007. (see p. 8 on prioritized SLOs).
Hewlett-Packard Company, Chapter 9 "Example Configuration Files", HP-UX Workload Manger User's Guide, Jan. 2007, pp. 1-19, 283-285, 334-337, especially p. 334.

* cited by examiner

*Primary Examiner* — Mengyao Zhe

(57) ABSTRACT

A computer system allocates computer resources to workloads by generated plural requests per combination of workload and allocation period from probability distributions generated at least in part from utilization data.

20 Claims, 4 Drawing Sheets

ALLOCATING COMPUTER RESOURCES TO WORKLOADS USING UTILIZATION BASED PROBABILITY DISTRIBUTIONS

BACKGROUND OF THE INVENTION

Workloads consist of computer executable entities to which the assignment of hardware and software computing resources can be controlled. It is usual to consider workloads as executing in resource containers/compartments/partitions to which computing resources may be allocated and assigned.

Workload management software functions by monitoring operating parameters (e.g., resource utilization) of workloads, predicting the resources required to keep these operating parameters of each workload near user-specified targets, and allocating and assigning resources to workloads based on these predictions and other resource management parameters. Some of these other resource management parameters (e.g., the minimum and maximum resource levels that a partition can support) are hardware or software related, while others (e.g., minimum, maximum, and owned) are specified by the user Various means may be employed to predict the resource requirements of individual workloads. Predictions may be made based on current and/or recent previous requirements. Correlations may be sought between historical resource requirements and other workload or environmental parameters and said correlations exploited to make predictions. Standard workload management practice is to make a single resource requirement prediction for each workload, which in some sense represents the best prediction or most likely resource requirement (i.e. the resource amount most likely to have the workload meet the desired operating objective), and to allocate resources to attempt to satisfy those requirement predictions.

Allocation may be performed by constructing a list of resource requests for each workload, with a priority associated with each, defining the relative importance of satisfying that request. An example of a resource request list in order of decreasing priority follows.

1) The minimum resource required for the resource partition to which the workload is assigned.

2) The minimum resource requested by the user for the workload, i.e., the "policy" minimum.

3) The whole or part of the predicted resource demand for the workload that is less than or equal to a user-specified "owned" amount. This is called the "owned" request. An "owned" resource amount is an amount of resources that is reserved specifically for the workload's use if needed, but is available on a lower priority basis to other workloads when not needed by the owner.

4) The part of the predicted demand that is greater than the user-pecified owned amount but not exceeding the user-specified maximum. This is called the "borrow" amount. This item only applies to workloads for which the predicted amount exceeds the owned amount.

5) The part of the owned amount that is greater than the predicted amount. This item only applies to workloads for which the owned amount is greater than the predicted amount.

6) The maximum resource requested by the user for the workload, i.e., the policy maximum.

7) The maximum resource that may be assigned to the workload's resource partition.

Note that these resource requests are generally increasing in size and decreasing in priority. Any resource request that is smaller than a higher priority request is ignored in any event, since it will automatically be satisfied when the higher priority request is filled.

The allocation process distributes the available resources across these requests from the workloads in accordance with the priorities. That is, for example, resources are allocated first to satisfy the resource partition minima of all workloads, then the policy minima, the owned requests, the borrow requests, etc. Once the borrow requests are satisfied, the remainder of the allocation involves distributing the excess resource, first to give each workload its full owned amount, and then if resource remains to try to fulfill policy maxima, and then the partition maxima.

In the event that remaining resources are inadequate to satisfy the requests of all workloads at any priority level, a rule for dividing those remaining resources among the equal priority requests is used. For example, the remaining resources can be divided equally among workloads, in proportion to unfulfilled request amounts, or in proportion to user-specified weightings that function as a kind of secondary priority.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
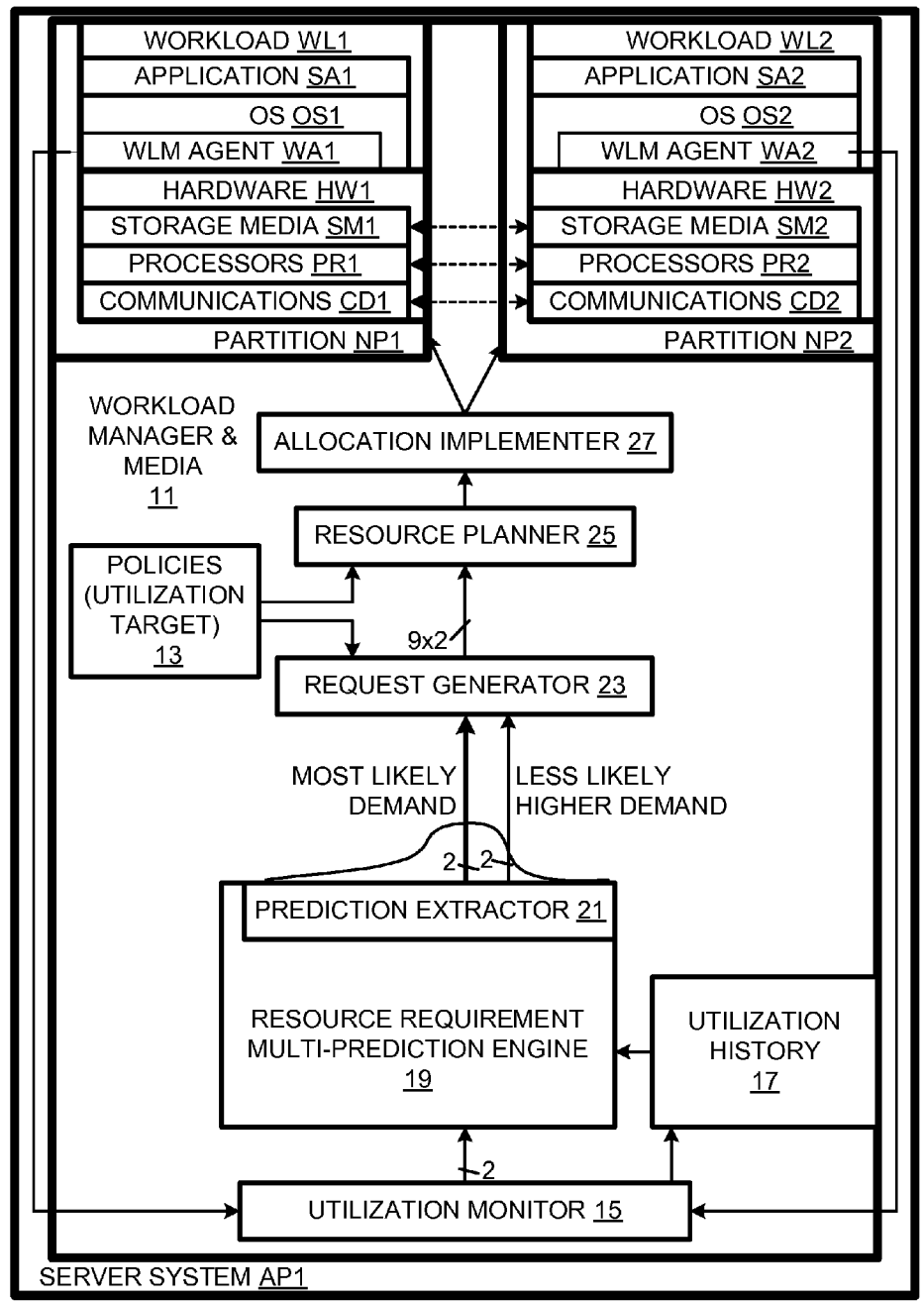
FIG. 1 is a schematic diagram of a server in accordance with an embodiment of the invention.

In the course of the present invention, it was recognized that the foregoing resource allocation method could be improved by considering supplementary resource requirement predictions, which although less likely to occur than the "best" predictions, still reflect additional knowledge concerning the possible operation of the workloads. These alternate predictions are then incorporated into the allocation process through the generation of additional allocation requests that are assigned lower priorities than the allocation requests generated for the "best" predictions. Each successively less likely prediction is assigned a successively lower priority. The effect of this is that after resources have been allocated to each workload to satisfy the resource requirements associated with the best or most likely predictions, if unallocated resources remain, they will next be allocated to satisfy the resource requirements associated with the next most likely prediction for each workload and so on, until either all resources are allocated or all of the additional allocation requests have been satisfied, in which case the remainder of the allocation is carried out in the manner previously described.

The net effect of this procedure is to first allocate resources in accordance with the most-likely resource requirements of each workload and then if resources remain, in accordance with the next most likely higher resource requirements of each workload, and so on. By this means, the total resources allocated to each workload will reflect the uncertainty in the resource predictions for the workloads. Take for example the extreme case of a workload A for which the resource prediction is almost certain and a workload B for which the resource prediction is very uncertain. In this case the alternate predictions for A will result in additional allocation requests whose amounts are very close to the allocation request for the best prediction, while the corresponding alternate requests for B will be for significantly more resource than for B's best prediction request. As a result, if resources remain after satisfying the best prediction requests, those resources will be preferentially allocated to workload B. This is desirable, since the likelihood that B will need resources beyond that suggested by the best prediction for B is much higher than that A will require additional resources beyond its best prediction. This result would not be achieved by allocation methods that only allocate according to a single best prediction. Thus the present invention improves the match between resource allocations and user objectives by generating resource requests for several probable resource predictions instead of only generating requests based on a single "best" prediction.

Supplementary resource requirement predictions may be generated through a variety of means. In one embodiment, resource requirement predictions may be considered to be represented by probability distributions whose values reflect the predicted likelihood of occurrence of various resource requirement values for a workload. Predictions may still be in the form of single values that are now to be interpreted as representing one of the parameters characterizing a probability distribution [e.g. the mean, the median, or the mode]. Alternatively, predictions may now be in the form of a set of parameters partially or completely characterizing a probability distribution [such as the mean and standard deviation of a gaussian or normal distribution], or in the form of an explicit probability distribution. An explicit distribution may in turn consist of a mathematical function or algorithm from which individual probabilities may be derived, or a list of resource predictions with associated probabilities.

Supplementary resource requirement predictions may be generated from workload resource requirement prediction probability distributions by predefining a set of points [e.g. $25^{th}$, $50^{th}$ $75^{th}$ percentiles] in the cumulative distribution function [CDF] and associating an allocation priority with each. Then supplementary allocation requests may be generated for each workload by extracting a predicted resource value for each point from the workload's CDF and combining that value with the associated allocation priority. This method may be further refined by starting only with a range of priorities for the supplementary requests and preprocessing the workload CDFs to determine the number and spacing of CDF points to use based upon variations in the respective CDFs. That is, the less smooth the variations in the CDFs and the greater the differences in shape between the CDFs, the more points it would be desirable to extract from the CDFs to ensure that the resource requirement predictions of each workload be comparably represented.

Note that each "best" prediction will in some sense be from somewhere in the "middle" of the associated probability distribution. Thus there will be alternate, less likely, predictions available for both more and less resources than the best prediction. However, since the alternate predictions are assigned lower priorities than the best predictions, alternate predictions for resource amounts lower than that associated with the best prediction can safely be ignored, since allocation requests generated for them will be less than the allocation request for the best prediction and will thus automatically be satisfied when allocation is made on behalf of the [higher priority] best prediction.

Alternatively, allocation requests could be generated at priorities higher than that for the best prediction to reflect the probability distributions for predicted resource amounts lower than the best predictions. This would serve to improve allocation in cases where insufficient resources are available to satisfy all of the best predictions. That is, for a given best prediction X and supplementary prediction Y which is less than X, the probability that the actual resource requirement is at least Y is greater than the probability that it is at least X. Thus an allocation request for amount Y should be generated with a priority greater than the allocation request for amount X. Then, in the event that resources are exhausted after allocations at the priority level associated with Y and before the priority associated with X, the workload will have had the amount Y allocated. This manner of allocation better reflects the needs of the workload than would an even or proportional distribution of the remaining resource.

In alternate embodiments, probability distributions are not needed to generate supplementary resource requirement predictions. Multiple predictions may be automatically generated, for example, from multiple prediction engines. As long as multiple predictions are available, from whatever source, or can be created from the existing best predictions and those multiple predictions can be ordered as to confidence or likelihood, priorities can be associated in similar decreasing order with those predictions to generate supplementary allocation requests. Alternatively, the available likelihood or confidence information for these predictions may be used to generate probability distributions, from which the forgoing method may be used to create supplementary allocation requests. This latter approach would be useful in the event that probability distribution data was available for some workloads and multiple predictions for others.

As shown in FIG. 1, a server system AP1 implementing an embodiment of the invention includes a workload manager and associated media 11 storing the software components thereof, and partitions NP1 and NP2. Hardware HW1 of partition NP1 includes processors PR1, communications devices CD1 (e.g., I/O devices and network adapters), and storage media (e.g., main memory and disk-based storage). The software workload WL1 running on partition NP1 includes an application program SA1 and an operating system OS1 including a workload manager agent WA1. Likewise, partition NP2 includes processors PR2, communications devices CD2 (e.g., I/O devices and network adapters), and storage media (e.g., main memory and disk-based storage) SM2. A workload WL2 running on partition NP2 includes application program SA2 and an operating system 052 including a workload manager agent WA2.

Workload manager 11 allocates computer resources between partitions NP1 and NP2, and thus between workloads WL1 and WL2 in accordance with management policies 13. Workload manager 11 includes management policies 13, a utilization monitor 15, a utilization history 17, a multi-prediction engine 19 including a prediction extractor 21, a request generator 23, a resource planner 25, and an allocation implementer 27.

Management policies 13 specify values for each of several parameters for each workload WL1 and WL2. In embodiments that have several workloads, workloads can be grouped and some policies can be applied to groups of workloads as well as to individual workloads. Some of the parameters that can be specified include target utilization, minimum, owned, and maximum demand levels, and weightings to be used as secondary priorities when the remaining resources are not sufficient to meet a request level for both (all) workloads.

Utilization monitor 15 gathers utilization data forwarded to it by agents WA1 and WA2 along with data indicating the amount of resources active in their respective partitions. Some embodiments have policies based on other monitored parameters. For example, load and performance can also be monitored, e.g., in terms of the number of requests handled by a workload and the average time to handle a request.

Utilization history 17 compiles data gathered over time by utilization monitor 15 and associates it with allocation information, e.g., from resource planner 25. Thus, history 17 can compare actual utilization (from utilization monitor 15) and expected utilization (from resource planner 25) for each workload and allocation period.

Multi-prediction engine 19 generates plural predictions for computer resource requirements for each combination of workload and allocation period. Engine 19 can be programmed to generate multiple discrete predictions directly, or to generate continuous probability density distributions or cumulative probability distributions from which multiple predictions can be extracted by prediction extractor 21. These predictions are based on current utilization levels from utilization monitor 15, past utilization levels (that can show periodicity and trends), and prediction accuracy (based on comparisons of expected and actual utilization). For example, if a prediction is that the current demand level will be repeated in the next allocation period, the predicted demand is the current utilization level times the current allocation of resources. A representative distribution curve is shown above engine 19 in FIG. 1. While a continuous distribution is represented, alternative embodiments provide for discrete predictions, e.g., separately predicted demand levels with associated confidence levels.

Prediction extractor 21 extracts discrete predictions from a continuous distribution or a discrete distribution for at least one workload. For a typical bell shaped distribution, the demand with the peaked confidence level is selected as the primary prediction. A secondary prediction can be selected one standard deviation above the primary prediction. For embodiments that generate discrete distributions, the demand with the highest confidence level can selected as the primary prediction, while the demand level above the primary demand level and having the highest remaining confidence level is selected as the secondary prediction. Higher order predictions with lower confidence levels and higher demand levels can be selected. FIG. 1 represents a case in which primary and secondary predictions are extracted from a probability distribution.

Request generator 23 generates requests based on partition characteristics and user specified (via policies 13) minimum, maximum, and ownership levels for each workload. In the illustrated embodiment, up to nine requests are generated for each workload for each allocation period. These include seven listed in the background section above, plus additional requests based on a secondary prediction: one additional owned request and one additional borrow request. Of course, if there is no secondary prediction, these additional requests are not generated. In an alternative embodiment, additional (e.g., tertiary and higher-order) supplementary owned and/or borrowed allocations are provided for. In the illustrated case, involving a secondary prediction, a descending priority request list takes the following form.

1. Partition minimum.
2. User-specified minimum.
3. Primary owned amount.
4. Secondary owned amount.
5. Primary borrowed amount.
6. Secondary borrowed amount.
7. Full policy owned amount.
8. User-specified maximum.
9. Partition maximum.

The prediction-based owned and borrowed requests are for resources levels required to achieve target utilization levels specified by policies 13. Thus, if prediction engine 19 provides a prediction that the demand level for workload WL1 will be for four processors in the next allocation period and management policies specify an 80% target utilization level, request generator 23 generates a request for five processors.

Resource planner 25 allocates available resources in response to the requests from request generator 23. Available resources are first allocated to meet the partition minimum for all workloads. Then the user-specified minimum requests are met if possible, and so on down the priority list. When a request priority type is reached for which the remaining resources are insufficient to meet the requests of all workloads, the remaining resources are distributed as specified by policies 13. Allocation implementer 27 implements the planned allocation by assigning computer resources to the managed resource partitions.

Figure 2:
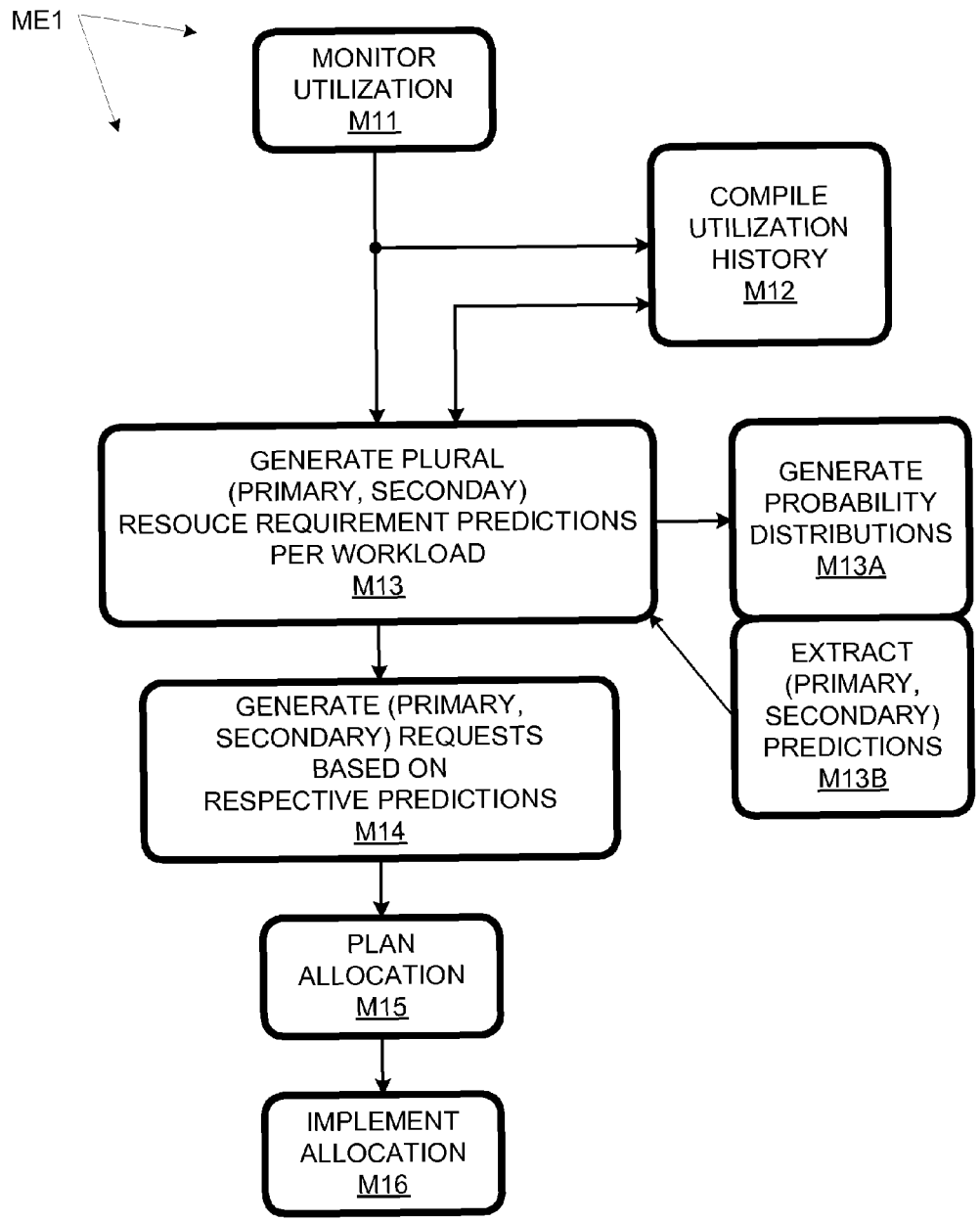
FIG. 2 is a flow chart of a method in accordance with an embodiment of the invention.

System AP1 implements a method ME1 as flow charted in FIG. 2. At method segment M11, workloads WL1 and WL2 are monitored. Monitor 15 gathers current utilization data. At method segment M12, the utilization data is compiled in history 17, where it can be compared to expected utilization values for updating prediction engine 19.

Prediction engine 19 generates multiple predictions at method segment M13. Multiple discrete predictions can be generated directly, e.g., using multiple prediction subengines or extracted at method subsegment 13B from continuous distributions generated at method subsegment M13A. At method segment M14, request generator 23 generates requests for resources for each workload for the upcoming allocation period. The requests include prediction-based requests and other requests. The prediction-based requests include requests based both on primary predictions and secondary predictions.

Allocation planner 25 plans an allocation by meeting requests in order of priority at method segment M15. The planned allocation is implemented at method segment M16.

Figure 3:
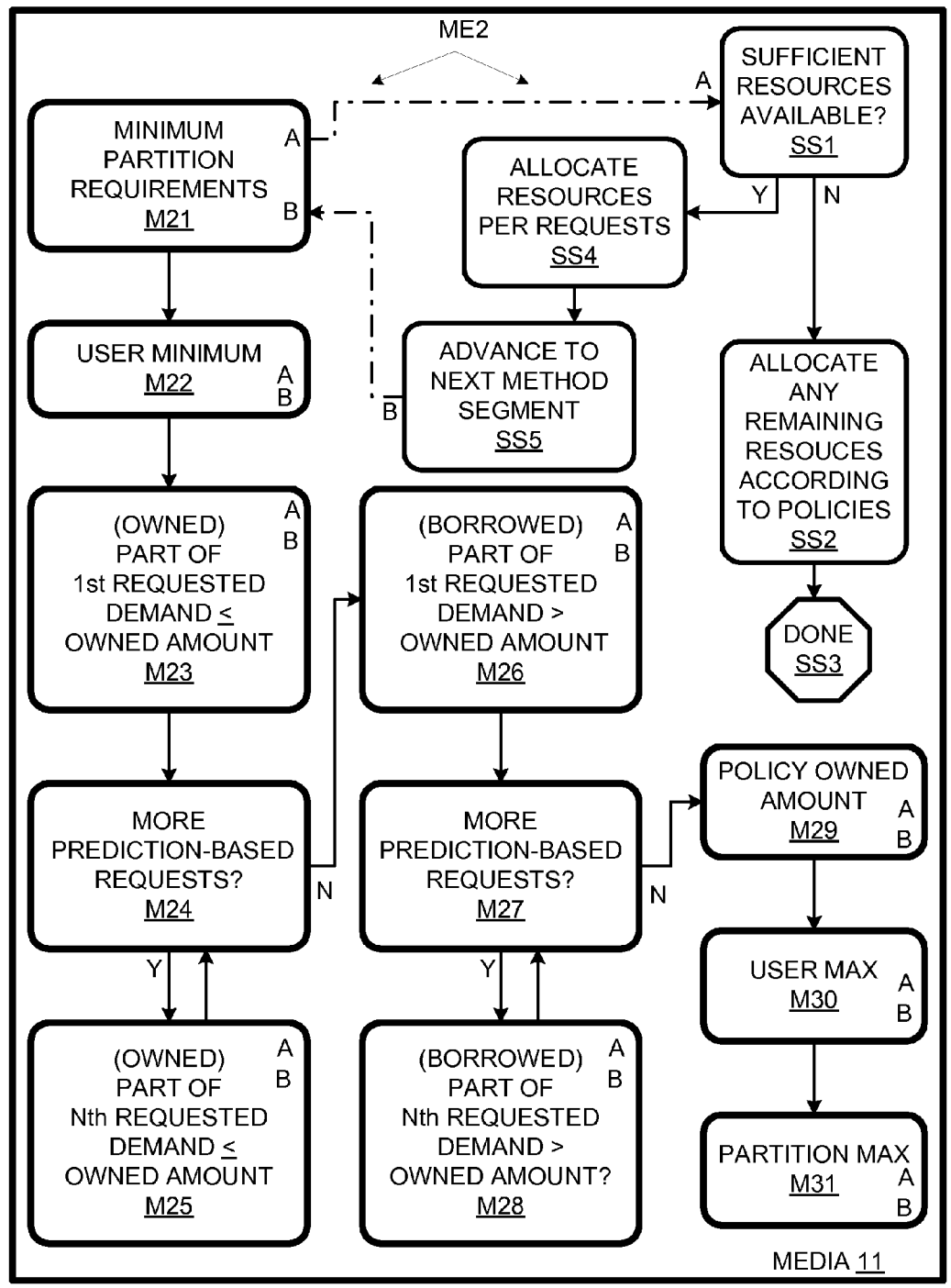
FIG. 3 is a flow chart of another method in accordance with an embodiment of the invention.

Allocation planner 25 implements method ME2, flow charted in FIG. 3. At method segment M21, requests to meet the minimum partition requirements are considered. These requests are typically fulfilled. If they cannot be fulfilled, a warning is issued because system AP1 cannot operate properly unless the minimum partition requirements are met.

Every allocation method segment (all method segments with an "A" exit point and a "B" return point as shown in FIG. 3, i.e., method segments M21-M23, M24-M26, and M28-M31), involves a submethod beginning with method subsegment SS1. At method subsegment SS1, the sufficiency of available resources to meet the requests of the current priority (associated with the current method segment) is determined. If the resources are not sufficient, remaining resources, if any, are distributed according to management policies, e.g., equally among workloads or in proportion to the outstanding requests. Since there are no more resources to allocate, method ME2 ends at method subsegment SS3.

If sufficient resources are available as determined at method subsegment SS1, the requests for the current method segment are fulfilled at method subsegment SS4. Then, method ME2 moves to the next method subsegment, as indicated at method subsegment SS5.

At method segment M22, planner 25 addresses the requests based on user-specified minima. If the user minima for every workload cannot be met, the remaining resources (after those allocated to meet minimum partition requirements) are distributed evenly or according to user-specified weightings among the partitions. If the user minima can be met, method ME2 proceeds to method segment M23.

Planner 25 addresses the primary owned requests at method segment M23. These requests are for the amount of resources required to meet target utilizations for each workload assuming that the primary demand predictions are accurate. The user specifies target utilizations via policies 13.

Assuming the primary owned requests are fulfilled, method segment M23 proceeds to method segment M24 to determine if there are any secondary owned requests. If there are, method ME2 proceeds to method segment M25 to handle the secondary owned request for each workload. If these secondary owned requests are fulfilled, method ME2 iterates method segments M24 and M25 to the extent necessary to handle requests based on higher-order predictions.

Once all primary and higher-order owned requests are fulfilled, primary borrowed requests are addressed at method segment M26. Such requests will have been generated only for those workloads in which the primary predicted level exceeds the owned level. Thus, method segment M26 may not call for any additional resources for some workloads.

In any event, method ME2 proceeds to method segment M27 to consider higher-order borrow requests. In the event of secondary borrow requests, method ME2 proceeds to method segment M28 to consider secondary borrowed requests. Since higher-order requests are for greater resource levels, a higher-order borrow request may exist even if a primary or other lower-order borrow request does not exist. Method segment M27 and M28 are iterated until all higher-order borrow requests are handled.

Once all borrow requests are fulfilled, method ME2 addresses policy-owned requests at method segment M29. Each workload is allocated the amount specified as "owned" in policies 13. These requests contribute only to workloads having ownership levels above all predicted demand levels as adjusted to meet target utilizations. User maximum requests are fulfilled at method segment M30, and partition maximum requests are fulfilled at method segment M31.

Typically, resources are insufficient to meet a request at one of method segments M12-M31 (excluding method segments M24 and M27). Whatever level that is, the remaining resources are distributed to the workloads based on weightings specified by the user via polices 13. Once all available resources have been allocated, method ME2 ends, and the remaining method segments are skipped.

Note that any resource request that is smaller than a higher priority request is ignored, since it will automatically be satisfied when the higher priority request is filled. Note also that, in this embodiment, only the "owned" and "borrow" requests are determined from prediction-related requests. The remaining requests are determined only from configuration data or user specified parameters.

To incorporate uncertainty concerning resource requests into this allocation means having multiple "owned" and/or "borrow" requests, since these are the only requests that are determined from the operation of the workload by the prediction engines. In alternate embodiments, supplementary allocation requests might be generated and included for only "owned" or "borrow" requests or for other combinations of allocation requests, as long as said requests were generated at least in part based upon the expected resource requirements of the associated workloads.

The invention provides for alternative methods for extracting requests from probability distributions. For example, a method ME3, flow charted in FIG. 4, extracts requests from cumulative probability distributions. At method segment M41, a prediction engine generates resource requirement predictions for each workload based on current and previous environmental and workload operation data.

The invention provides for using a variety of prediction engines in a variety of combinations. Accordingly, method segment M42 provides for identifying the form of a prediction. As illustrated in FIG. 3, at least three forms can be distinguished: 1) predictions in the form of a probability distribution; 2) predictions in the form of values of parameters characterizing a probability distribution; and 3) a single predicted value and default probability distribution parameters. In case 1) a probability distribution is given, while in cases 2) and 3) it must be constructed at method segment M43.

At method segment M44, a list of cumulative probability values is generated or selected. The list can be pre-selected, e.g., evenly spaced percentile levels such as quartiles or deciles can be selected. Alternatively, the list can be derived from the probability distributions, e.g., to match peaks of probability density functions. In either case, the list serves to identify the cumulative probability values for which predicted resources values should be determined from each workload's probability distribution and the priorities to be associated with those resource values in generating allocation requests for those workloads At method segment M45, allocation requests are generated for each workload for each entry in the list of cumulative probability values. The resource amount is determined for each listed cumulative probability from the probability distribution associated with the workload. Each resource amount is assigned the priority associated with the listed cumulative probability. For example, the graph of FIG. 4 indicates the likelihood that a resource allocation will meet (or exceed) the requirements of a respective workload. Equivalently, this can be thought of as the predicted probability that the workload's resource requirement will exceed the given resource amount. So the resource value for the $25^{th}$ percentile, is the amount which will be greater than the workload's requirement 25% of the time or, in other words, 75% of the time [i.e. with high probability] the workload will require at least that much resource or more. Similarly, the resource value for the 50% will be exceeded by the workload's need 50% of the time and the 75% percentile resource value will only be exceeded 25% of the time. Thus the 25 th percentile resource value is assigned the highest priority "1"; the 50th percentile resource value is assigned an intermediate priority "2"; and the 75th percentile resource value is assigned the lowest priority "3".

Figure 4:
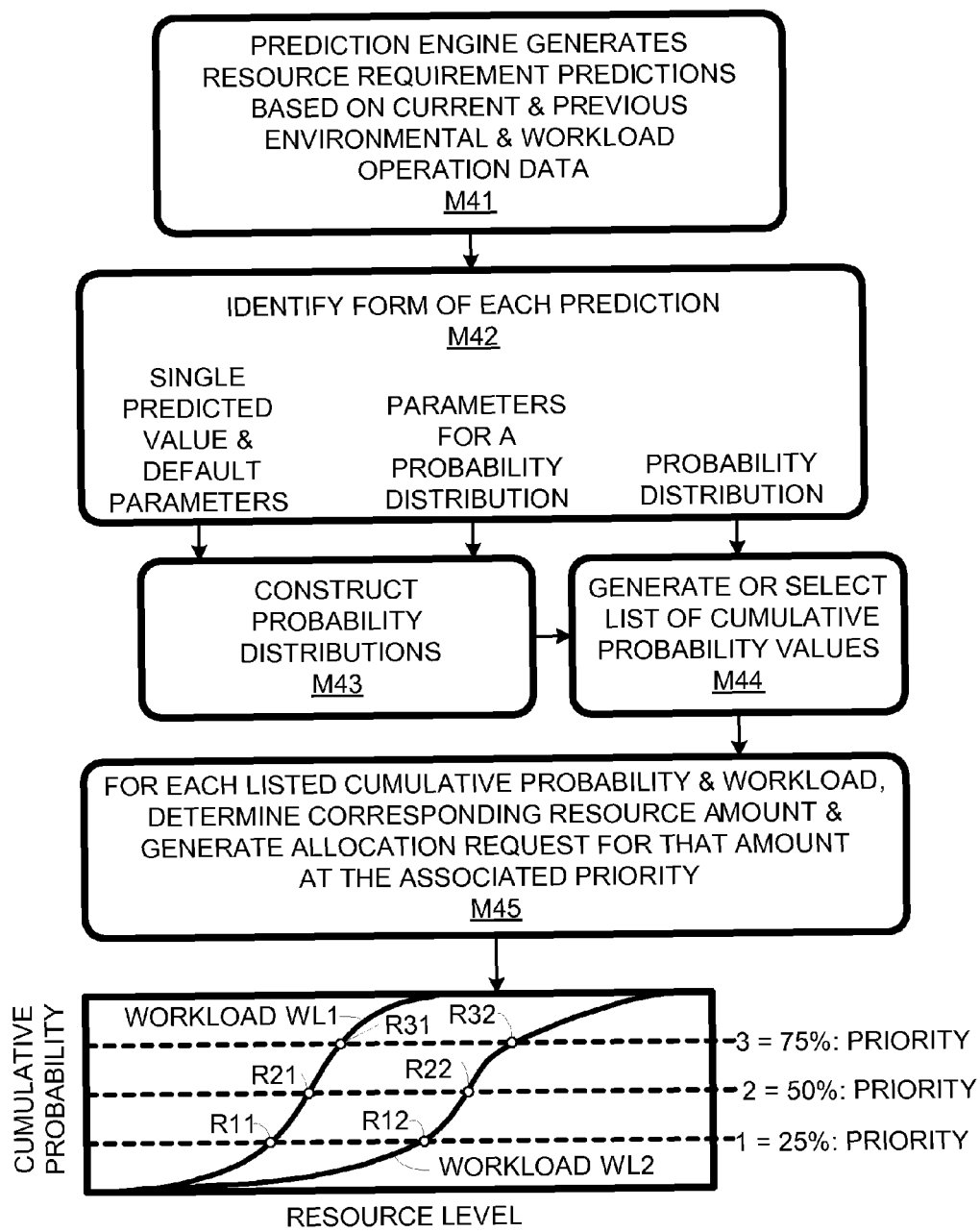
FIG. 4 is a combination flow chart and graph of a method for generating requests from cumulative probability distributions in accordance with an embodiment of the invention.

In the graph of FIG. 4, graph point R11 indicates a resource level that would have a 25% likelihood of meeting the requirements of workload WL1 in the next allocation period [i.e. the likelihood is 75% that the workload requirement will exceed R11]. A corresponding high-priority request is generated for that resource level. Graph point R12 indicates a resource level that would have a 25% of meeting the requirements of workload WL2 in the next allocation period. A corresponding request for the indicated resource level is generated having the same high priority which was used to generate the allocation requests based on graph point R11. Likewise intermediate priority requests R21 and R22 are generated, as are low priority requests R31 and R32, for respective workloads and cumulative probabilities.

During allocation planning, resources are allocated to meet high priority requests R11 and R12 first. At this point in the allocation planning, each workload will have received resources which will be needed 75% of the time. If those requests are met, resources are allocated to meet intermediate priority requests R21 and R22 if possible. At this point in the allocation planning, each workload will have received resources which will be needed 50% of the time. If those requests are met, resources are allocated to meet low priority requests R31 and R32. At this point in the allocation planning, each workload will have received resources which will be needed 25% of the time. Thus it can be seen that the information inherent in the probabilistic predictions for resource demand has been used to order the allocation of resources so that all workloads receive resources in accordance with the likelihood that the resources will be useful to the workload. Whenever requests of a given priority cannot be fulfilled, available resources are divided according to management policy, e.g., in proportion to the unfulfilled requests.

To maximize the percentages of resources allocated according to probability distributions, more listed probabilities spaced closer together can be used. However, there is a tradeoff in that more computation is required to determine a larger set of requests. In any event, resource granularity imposes a practical limit on the number and spacing of listed probabilities.

This invention uses probabilistic information on workload resource requirements to make resource allocations which are more likely to satisfy the actual resource needs of workloads, since less likely requirements for greater amounts of resources may be satisfied when excess resources are available after satisfying the most likely resource requirements of each workload. The advantage of this over previous methods is that resource allocation is more efficient—on average fewer resources should be required for satisfactory operation of a given set of workloads—and reduced resource use means lowered cost of operation.

The present invention can apply to systems with any number of partitions or workloads among which resources can be allocated. The resources can be processors, storage media, and communications devices. Each category can be considered separately, and types within each category (network interfaces versus disk interface, disk-based storage versus main memory) can be considered separately. However, in some embodiments, resource types are considered in combination, e.g., the number of processors allocated can affect the amount of main memory that should be allocated. These and other variations upon and modification to the illustrated embodiments are provided for by the present invention, the scope of which is defined by the following claims.

What is claimed is:

1. A computer system comprising:
   hardware resources;
   plural partitions for running respective workloads using said hardware resources;
   a prediction engine for generating conflicting predictions per workload representing resource levels of said hardware resources expected to meet requirements of each of said workloads for said hardware resources for a given allocation period;
   a resource requestor for generating resource requests as functions of respective ones of said predictions;
   a resource planner for planning an allocation plan by the beginning of said allocation period, said plan specifying an allocation of said hardware resources to said partitions, said allocation plan being at least in part a function of each of said requests; and
   a resource implementer for implementing said allocation plan for said allocation period.

2. A computer system as recited in claim 1 wherein, for at least one of said workloads, said prediction engine generates plural single-value predictions, said resource requestor generating requests corresponding to at least two of said single-value predictions for the same workload and allocation period.

3. A computer system as recited in claim 1 wherein, for at least one of said workloads, said prediction engine generates a probability distribution, said prediction engine including a prediction extractor for extracting plural predictions from said probability distribution.

4. A computer system as recited in claim 3 wherein said prediction extractor generates predictions corresponding to a list of cumulative probabilities, each of said cumulative probabilities representing a likelihood that requirements of a respective workload will be met by a resource level corresponding to that cumulative probability for that workload, each of said resource levels and cumulative probabilities being determined from a respective probability distribution.

5. A computer system as recited in claim 4 wherein said planner allocates resources by filling requests with lower associated cumulative probabilities on a priority basis.

6. A computer system as recited in claim 1 wherein said prediction engine provides a primary prediction with a relatively high confidence level and for a relatively low resource level and a secondary prediction with a relatively low confidence level and for a relatively high resource level, said request generator generating corresponding primary and secondary requests respectively from said primary and secondary predictions, said planner filling all primary requests before filling corresponding secondary requests.

7. A computer system as recited in claim 6 wherein said resource requestor generates primary and secondary owned requests and primary and secondary borrow requests for at least some of said workloads.

8. A computer system as recited in claim 1 wherein said resources requestor generates primary, secondary and higher order requests based on said predictions.

9. A method for allocating computer resources to computer workloads, said method comprising:
   gathering utilization data for said workloads;
   generating conflicting primary and secondary predictions for resource levels to be required by each of said workloads for a given allocation period;
   generating primary and secondary respective resource requests respectively from each of said predictions;
   planning an allocation for said allocation period of resources to workloads based on said primary requests and on said secondary requests, said planning giving higher priority to fulfilling said primary requests than to fulfilling said secondary requests, said planning being completed by the beginning of said allocation period; and
   implementing said allocation for said allocation period.

10. A method as recited in claim 9 wherein said predicting involves generating a probability distribution for each of said workloads and extracting said predictions from said probability distributions.

11. A method as recited in claim 9 wherein each of said primary predictions has a higher confidence level than does the respective secondary prediction.

12. A method as recited in claim 9 further comprising assigning owned levels to said partitions, said requests including primary and secondary owned and primary and secondary borrow requests for each workload for a given allocation period.

13. A method as recited in claim 10 wherein said extracting involves selecting predictions with successively higher cumulative probabilities of satisfying the requirements of their respective workloads and assigning successively lower allocation priorities to allocation requests generated from said predictions.

14. A method as recited in claim 13 wherein said cumulative probabilities are selected from a list that is generated independently of said probability distributions.

15. A method as recited in claim 13 wherein said cumulative probabilities are selected from a list that is generated from said probability distributions.

16. A computer product comprising non-transitory computer-readable storage media encoded with code to, when executed by a processor, implement a method including:
   gathering utilization data for said workloads;
   generating conflicting primary and secondary predictions for resource levels to be required by each of said workloads for a given allocation period;
   generating primary and secondary respective resource requests respectively from each of said predictions;
   planning an allocation for said allocation period of resources to workloads based on said primary requests and on said secondary requests, said planning giving higher priority to fulfilling said primary requests than to fulfilling said secondary requests, said planning being completed by the beginning of said allocation period; and
   implementing said allocation for said allocation period.

17. A computer product as recited in claim 16 wherein said planning gives higher priority to fulfilling said primary request than it does fulfilling said secondary request.

18. A computer product as recited in claim 17 wherein each of said secondary requests is for a greater resource level than is the respective primary request is for.

19. A computer product as recited in claim 16 wherein said generating further includes:
   generating a prediction distribution of confidence level as a function of demand level; and
   extracting said primary and secondary predictions from said distribution.

20. A computer product as recited in claim 19 wherein said extracting including applying a list of cumulative probabilities to extract said primary and secondary predictions, each of said primary predictions corresponding to a respective lowest cumulative probability in said list and each of said secondary predictions corresponding to a respective second lowest cumulative probability in said list.

* * * * *

UNITED STATES PATENT AND TRADEMARK OFFICE
CERTIFICATE OF CORRECTION

PATENT NO. : 8,312,460 B1  
APPLICATION NO. : 11/752231  
DATED : November 13, 2012  
INVENTOR(S) : William H. Blanding It is certified that error appears in the above-identified patent and that said Letters Patent is hereby corrected as shown below:

Title page, illustrative FIG. 4, above "Reference numeral M41" insert -- ME3 --.

In the Drawings

Drawing sheet 4 of 4, above "Reference numeral M41" insert -- ME3 --.

Signed and Sealed this
Twenty-second Day of October, 2013

Teresa Stanek Rea
*Deputy Director of the United States Patent and Trademark Office*